United States Patent
Hamilton et al.

(10) Patent No.: US 9,153,287 B1
(45) Date of Patent: Oct. 6, 2015

(54) DATA ACCESS FOR SHINGLED MAGNETIC RECORDING MEDIA

(71) Applicant: Western Digital Technologies, Inc., Irvine, CA (US)

(72) Inventors: David M. Hamilton, Trabuco Canyon, CA (US); Patrick J. Lee, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 186 days.

(21) Appl. No.: 13/914,463

(22) Filed: Jun. 10, 2013

Related U.S. Application Data (60) Provisional application No. 61/822,666, filed on May 13, 2013.

(51) Int. Cl.
  G06F 12/00 (2006.01)
  G11B 27/10 (2006.01)
(52) U.S. Cl.
  CPC ..................................... *G11B 27/10* (2013.01)
(58) Field of Classification Search
  None
  See application file for complete search history.

(56) References Cited

U.S. PATENT DOCUMENTS

| | | | |
|---|---|---|---|
| 5,864,440 A * | 1/1999 | Hashimoto et al. ............. 360/53 |
| 5,915,260 A | 6/1999 | Sokolov | |
| 6,018,789 A | 1/2000 | Sokolov et al. | |
| 6,065,095 A | 5/2000 | Sokolov et al. | |
| 6,078,452 A | 6/2000 | Kittilson et al. | |
| 6,081,447 A | 6/2000 | Lofgren et al. | |
| 6,092,149 A | 7/2000 | Hicken et al. | |
| 6,092,150 A | 7/2000 | Sokolov et al. | |
| 6,094,707 A | 7/2000 | Sokolov et al. | |
| 6,105,104 A | 8/2000 | Guttmann et al. | |
| 6,111,717 A | 8/2000 | Cloke et al. | |
| 6,145,052 A | 11/2000 | Howe et al. | |
| 6,175,893 B1 | 1/2001 | D'Souza et al. | |
| 6,178,056 B1 | 1/2001 | Cloke et al. | |
| 6,191,909 B1 | 2/2001 | Cloke et al. | |
| 6,195,218 B1 | 2/2001 | Guttmann et al. | |
| 6,205,494 B1 | 3/2001 | Williams | |
| 6,208,477 B1 | 3/2001 | Cloke et al. | |
| 6,223,303 B1 | 4/2001 | Billings et al. | |
| 6,230,233 B1 | 5/2001 | Lofgren et al. | |
| 6,246,346 B1 | 6/2001 | Cloke et al. | |
| 6,249,393 B1 | 6/2001 | Billings et al. | |
| 6,256,695 B1 | 7/2001 | Williams | |
| 6,262,857 B1 | 7/2001 | Hull et al. | |
| 6,263,459 B1 | 7/2001 | Schibilla | |
| 6,272,694 B1 | 8/2001 | Weaver et al. | |
| 6,278,568 B1 | 8/2001 | Cloke et al. | |
| 6,279,089 B1 | 8/2001 | Schibilla et al. | |
| 6,289,484 B1 | 9/2001 | Rothberg et al. | |
| 6,292,912 B1 | 9/2001 | Cloke et al. | |

(Continued)

*Primary Examiner* — Gary Portka (57) ABSTRACT

Methods and apparatus for facilitating pre-read and/or post-read operations of a disk drive. A write command is received including a logical block address (LBA) for user data in the write command. Parity data for correcting the user data is generated by encoding the LBA with the user data. The parity data is written on a disk of the disk drive with the user data so that the LBA can be recovered using the parity data when read from the disk. When a read command is received by the disk drive, requested user data is read from a first sector. User data and parity data is read from a second sector adjacent the first sector. The parity data is used to recover an LBA for the second sector and it is determined whether to store the user data read from the second sector based on the recovered LBA.

26 Claims, 7 Drawing Sheets

(56) References Cited

U.S. PATENT DOCUMENTS

| | | |
|---|---|---|
| 6,310,740 B1 | 10/2001 | Dunbar et al. |
| 6,317,850 B1 | 11/2001 | Rothberg |
| 6,327,106 B1 | 12/2001 | Rothberg |
| 6,337,778 B1 | 1/2002 | Gagne |
| 6,369,969 B1 | 4/2002 | Christiansen et al. |
| 6,384,999 B1 | 5/2002 | Schibilla |
| 6,388,833 B1 | 5/2002 | Golowka et al. |
| 6,405,342 B1 | 6/2002 | Lee |
| 6,408,357 B1 | 6/2002 | Hanmann et al. |
| 6,408,406 B1 | 6/2002 | Parris |
| 6,411,452 B1 | 6/2002 | Cloke |
| 6,411,458 B1 | 6/2002 | Billings et al. |
| 6,412,083 B1 | 6/2002 | Rothberg et al. |
| 6,415,349 B1 | 7/2002 | Hull et al. |
| 6,425,128 B1 | 7/2002 | Krapf et al. |
| 6,441,981 B1 | 8/2002 | Cloke et al. |
| 6,442,328 B1 | 8/2002 | Elliott et al. |
| 6,445,524 B1 | 9/2002 | Nazarian et al. |
| 6,449,767 B1 | 9/2002 | Krapf et al. |
| 6,453,115 B1 | 9/2002 | Boyle |
| 6,470,420 B1 | 10/2002 | Hospodor |
| 6,480,020 B1 | 11/2002 | Jung et al. |
| 6,480,349 B1 | 11/2002 | Kim et al. |
| 6,480,932 B1 | 11/2002 | Vallis et al. |
| 6,483,986 B1 | 11/2002 | Krapf |
| 6,487,032 B1 | 11/2002 | Cloke et al. |
| 6,490,635 B1 | 12/2002 | Holmes |
| 6,493,173 B1 | 12/2002 | Kim et al. |
| 6,499,083 B1 | 12/2002 | Hamlin |
| 6,519,104 B1 | 2/2003 | Cloke et al. |
| 6,525,892 B1 | 2/2003 | Dunbar et al. |
| 6,545,830 B1 | 4/2003 | Briggs et al. |
| 6,546,489 B1 | 4/2003 | Frank, Jr. et al. |
| 6,550,021 B1 | 4/2003 | Dalphy et al. |
| 6,552,880 B1 | 4/2003 | Dunbar et al. |
| 6,553,457 B1 | 4/2003 | Wilkins et al. |
| 6,578,106 B1 | 6/2003 | Price |
| 6,580,573 B1 | 6/2003 | Hull et al. |
| 6,594,183 B1 | 7/2003 | Lofgren et al. |
| 6,600,620 B1 | 7/2003 | Krounbi et al. |
| 6,601,137 B1 | 7/2003 | Castro et al. |
| 6,603,622 B1 | 8/2003 | Christiansen et al. |
| 6,603,625 B1 | 8/2003 | Hospodor et al. |
| 6,604,220 B1 | 8/2003 | Lee |
| 6,606,682 B1 | 8/2003 | Dang et al. |
| 6,606,714 B1 | 8/2003 | Thelin |
| 6,606,717 B1 | 8/2003 | Yu et al. |
| 6,611,393 B1 | 8/2003 | Nguyen et al. |
| 6,615,312 B1 | 9/2003 | Hamlin et al. |
| 6,639,748 B1 | 10/2003 | Christiansen et al. |
| 6,647,481 B1 | 11/2003 | Luu et al. |
| 6,654,193 B1 | 11/2003 | Thelin |
| 6,657,810 B1 | 12/2003 | Kupferman |
| 6,661,591 B1 | 12/2003 | Rothberg |
| 6,665,772 B1 | 12/2003 | Hamlin |
| 6,687,073 B1 | 2/2004 | Kupferman |
| 6,687,078 B1 | 2/2004 | Kim |
| 6,687,850 B1 | 2/2004 | Rothberg |
| 6,690,523 B1 | 2/2004 | Nguyen et al. |
| 6,690,882 B1 | 2/2004 | Hanmann et al. |
| 6,691,198 B1 | 2/2004 | Hamlin |
| 6,691,213 B1 | 2/2004 | Luu et al. |
| 6,691,255 B1 | 2/2004 | Rothberg et al. |
| 6,693,760 B1 | 2/2004 | Krounbi et al. |
| 6,694,477 B1 | 2/2004 | Lee |
| 6,697,914 B1 | 2/2004 | Hospodor et al. |
| 6,704,153 B1 | 3/2004 | Rothberg et al. |
| 6,708,251 B1 | 3/2004 | Boyle et al. |
| 6,710,951 B1 | 3/2004 | Cloke |
| 6,711,628 B1 | 3/2004 | Thelin |
| 6,711,635 B1 | 3/2004 | Wang |
| 6,711,660 B1 | 3/2004 | Milne et al. |
| 6,715,044 B2 | 3/2004 | Lofgren et al. |
| 6,724,982 B1 | 4/2004 | Hamlin |
| 6,725,329 B1 | 4/2004 | Ng et al. |
| 6,735,650 B1 | 5/2004 | Rothberg |
| 6,735,693 B1 | 5/2004 | Hamlin |
| 6,744,772 B1 | 6/2004 | Eneboe et al. |
| 6,745,283 B1 | 6/2004 | Dang |
| 6,751,402 B1 | 6/2004 | Elliott et al. |
| 6,757,481 B1 | 6/2004 | Nazarian et al. |
| 6,772,281 B2 | 8/2004 | Hamlin |
| 6,781,826 B1 | 8/2004 | Goldstone et al. |
| 6,782,449 B1 | 8/2004 | Codilian et al. |
| 6,791,779 B1 | 9/2004 | Singh et al. |
| 6,792,486 B1 | 9/2004 | Hanan et al. |
| 6,799,274 B1 | 9/2004 | Hamlin |
| 6,811,427 B2 | 11/2004 | Garrett et al. |
| 6,826,003 B1 | 11/2004 | Subrahmanyam |
| 6,826,614 B1 | 11/2004 | Hanmann et al. |
| 6,832,041 B1 | 12/2004 | Boyle |
| 6,832,929 B2 | 12/2004 | Garrett et al. |
| 6,845,405 B1 | 1/2005 | Thelin |
| 6,845,427 B1 | 1/2005 | Atai-Azimi |
| 6,850,443 B2 | 2/2005 | Lofgren et al. |
| 6,851,055 B1 | 2/2005 | Boyle et al. |
| 6,851,063 B1 | 2/2005 | Boyle et al. |
| 6,853,731 B1 | 2/2005 | Boyle et al. |
| 6,854,022 B1 | 2/2005 | Thelin |
| 6,862,660 B1 | 3/2005 | Wilkins et al. |
| 6,880,043 B1 | 4/2005 | Castro et al. |
| 6,882,486 B1 | 4/2005 | Kupferman |
| 6,884,085 B1 | 4/2005 | Goldstone |
| 6,888,831 B1 | 5/2005 | Hospodor et al. |
| 6,892,217 B1 | 5/2005 | Hanmann et al. |
| 6,892,249 B1 | 5/2005 | Codilian et al. |
| 6,892,313 B1 | 5/2005 | Codilian et al. |
| 6,895,455 B1 | 5/2005 | Rothberg |
| 6,895,500 B1 | 5/2005 | Rothberg |
| 6,898,730 B1 | 5/2005 | Hanan |
| 6,910,099 B1 | 6/2005 | Wang et al. |
| 6,928,470 B1 | 8/2005 | Hamlin |
| 6,931,439 B1 | 8/2005 | Hanmann et al. |
| 6,934,104 B1 | 8/2005 | Kupferman |
| 6,934,713 B2 | 8/2005 | Schwartz et al. |
| 6,940,873 B2 | 9/2005 | Boyle et al. |
| 6,943,978 B1 | 9/2005 | Lee |
| 6,948,165 B1 | 9/2005 | Luu et al. |
| 6,950,267 B1 | 9/2005 | Liu et al. |
| 6,954,733 B1 | 10/2005 | Ellis et al. |
| 6,961,814 B1 | 11/2005 | Thelin et al. |
| 6,965,489 B1 | 11/2005 | Lee et al. |
| 6,965,563 B1 | 11/2005 | Hospodor et al. |
| 6,965,966 B1 | 11/2005 | Rothberg et al. |
| 6,967,799 B1 | 11/2005 | Lee |
| 6,968,422 B1 | 11/2005 | Codilian et al. |
| 6,968,450 B1 | 11/2005 | Rothberg et al. |
| 6,973,495 B1 | 12/2005 | Milne et al. |
| 6,973,570 B1 | 12/2005 | Hamlin |
| 6,976,190 B1 | 12/2005 | Goldstone |
| 6,983,316 B1 | 1/2006 | Milne et al. |
| 6,986,007 B1 | 1/2006 | Procyk et al. |
| 6,986,154 B1 | 1/2006 | Price et al. |
| 6,995,933 B1 | 2/2006 | Codilian et al. |
| 6,996,501 B1 | 2/2006 | Rothberg |
| 6,996,669 B1 | 2/2006 | Dang et al. |
| 7,002,926 B1 | 2/2006 | Eneboe et al. |
| 7,003,674 B1 | 2/2006 | Hamlin |
| 7,006,316 B1 | 2/2006 | Sargenti, Jr. et al. |
| 7,009,820 B1 | 3/2006 | Hogg |
| 7,023,639 B1 | 4/2006 | Kupferman |
| 7,024,491 B1 | 4/2006 | Hanmann et al. |
| 7,024,549 B1 | 4/2006 | Luu et al. |
| 7,024,614 B1 | 4/2006 | Thelin et al. |
| 7,027,716 B1 | 4/2006 | Boyle et al. |
| 7,028,174 B1 | 4/2006 | Atai-Azimi et al. |
| 7,031,902 B1 | 4/2006 | Catiller |
| 7,046,465 B1 | 5/2006 | Kupferman |
| 7,046,488 B1 | 5/2006 | Hogg |
| 7,050,252 B1 | 5/2006 | Vallis |
| 7,054,937 B1 | 5/2006 | Milne et al. |
| 7,055,000 B1 | 5/2006 | Severtson |
| 7,055,167 B1 | 5/2006 | Masters |
| 7,057,836 B1 | 6/2006 | Kupferman |

(56) References Cited

U.S. PATENT DOCUMENTS

| | | |
|---|---|---|
| 7,062,398 B1 | 6/2006 | Rothberg |
| 7,075,746 B1 | 7/2006 | Kupferman |
| 7,076,604 B1 | 7/2006 | Thelin |
| 7,082,494 B1 | 7/2006 | Thelin et al. |
| 7,088,538 B1 | 8/2006 | Codilian et al. |
| 7,088,545 B1 | 8/2006 | Singh et al. |
| 7,092,186 B1 | 8/2006 | Hogg |
| 7,095,577 B1 | 8/2006 | Codilian et al. |
| 7,099,095 B1 | 8/2006 | Subrahmanyam et al. |
| 7,106,537 B1 | 9/2006 | Bennett |
| 7,106,947 B2 | 9/2006 | Boyle et al. |
| 7,110,202 B1 | 9/2006 | Vasquez |
| 7,111,116 B1 | 9/2006 | Boyle et al. |
| 7,114,029 B1 | 9/2006 | Thelin |
| 7,120,737 B1 | 10/2006 | Thelin |
| 7,120,806 B1 | 10/2006 | Codilian et al. |
| 7,126,776 B1 | 10/2006 | Warren, Jr. et al. |
| 7,129,763 B1 | 10/2006 | Bennett et al. |
| 7,133,600 B1 | 11/2006 | Boyle |
| 7,136,244 B1 | 11/2006 | Rothberg |
| 7,146,094 B1 | 12/2006 | Boyle |
| 7,149,046 B1 | 12/2006 | Coker et al. |
| 7,150,036 B1 | 12/2006 | Milne et al. |
| 7,155,616 B1 | 12/2006 | Hamlin |
| 7,171,108 B1 | 1/2007 | Masters et al. |
| 7,171,110 B1 | 1/2007 | Wilshire |
| 7,194,576 B1 | 3/2007 | Boyle |
| 7,200,698 B1 | 4/2007 | Rothberg |
| 7,205,805 B1 | 4/2007 | Bennett |
| 7,206,497 B1 | 4/2007 | Boyle et al. |
| 7,215,496 B1 | 5/2007 | Kupferman et al. |
| 7,215,771 B1 | 5/2007 | Hamlin |
| 7,237,054 B1 | 6/2007 | Cain et al. |
| 7,240,161 B1 | 7/2007 | Boyle |
| 7,249,365 B1 | 7/2007 | Price et al. |
| 7,263,709 B1 | 8/2007 | Krapf |
| 7,274,639 B1 | 9/2007 | Codilian et al. |
| 7,274,659 B2 | 9/2007 | Hospodor |
| 7,275,116 B1 | 9/2007 | Hanmann et al. |
| 7,280,302 B1 | 10/2007 | Masiewicz |
| 7,292,774 B1 | 11/2007 | Masters et al. |
| 7,292,775 B1 | 11/2007 | Boyle et al. |
| 7,296,284 B1 | 11/2007 | Price et al. |
| 7,302,501 B1 | 11/2007 | Cain et al. |
| 7,302,579 B1 | 11/2007 | Cain et al. |
| 7,318,088 B1 | 1/2008 | Mann |
| 7,319,806 B1 | 1/2008 | Willner et al. |
| 7,325,244 B2 | 1/2008 | Boyle et al. |
| 7,330,323 B1 | 2/2008 | Singh et al. |
| 7,346,790 B1 | 3/2008 | Klein |
| 7,366,641 B1 | 4/2008 | Masiewicz et al. |
| 7,369,340 B1 | 5/2008 | Dang et al. |
| 7,369,343 B1 | 5/2008 | Yeo et al. |
| 7,372,650 B1 | 5/2008 | Kupferman |
| 7,380,147 B1 | 5/2008 | Sun |
| 7,392,340 B1 | 6/2008 | Dang et al. |
| 7,404,013 B1 | 7/2008 | Masiewicz |
| 7,406,545 B1 | 7/2008 | Rothberg et al. |
| 7,415,571 B1 | 8/2008 | Hanan |
| 7,436,610 B1 | 10/2008 | Thelin |
| 7,437,502 B1 | 10/2008 | Coker |
| 7,440,214 B1 | 10/2008 | Ell et al. |
| 7,451,344 B1 | 11/2008 | Rothberg |
| 7,471,483 B1 | 12/2008 | Ferris et al. |
| 7,471,486 B1 | 12/2008 | Coker et al. |
| 7,486,060 B1 | 2/2009 | Bennett |
| 7,496,493 B1 | 2/2009 | Stevens |
| 7,518,819 B1 | 4/2009 | Yu et al. |
| 7,526,184 B1 | 4/2009 | Parkinen et al. |
| 7,539,924 B1 | 5/2009 | Vasquez et al. |
| 7,543,117 B1 | 6/2009 | Hanan |
| 7,551,383 B1 | 6/2009 | Kupferman |
| 7,562,282 B1 | 7/2009 | Rothberg |
| 7,577,973 B1 | 8/2009 | Kapner, III et al. |
| 7,596,797 B1 | 9/2009 | Kapner, III et al. |
| 7,599,139 B1 | 10/2009 | Bombet et al. |
| 7,619,841 B1 | 11/2009 | Kupferman |
| 7,647,544 B1 | 1/2010 | Masiewicz |
| 7,649,704 B1 | 1/2010 | Bombet et al. |
| 7,653,927 B1 | 1/2010 | Kapner, III et al. |
| 7,656,603 B1 | 2/2010 | Xing |
| 7,656,763 B1 | 2/2010 | Jin et al. |
| 7,657,149 B2 | 2/2010 | Boyle |
| 7,672,072 B1 | 3/2010 | Boyle et al. |
| 7,673,075 B1 | 3/2010 | Masiewicz |
| 7,688,540 B1 | 3/2010 | Mei et al. |
| 7,724,461 B1 | 5/2010 | McFadyen et al. |
| 7,725,584 B1 | 5/2010 | Hanmann et al. |
| 7,730,295 B1 | 6/2010 | Lee |
| 7,760,458 B1 | 7/2010 | Trinh |
| 7,768,776 B1 | 8/2010 | Szeremeta et al. |
| 7,804,657 B1 | 9/2010 | Hogg et al. |
| 7,813,954 B1 | 10/2010 | Price et al. |
| 7,827,320 B1 | 11/2010 | Stevens |
| 7,839,588 B1 | 11/2010 | Dang et al. |
| 7,843,660 B1 | 11/2010 | Yeo |
| 7,852,596 B2 | 12/2010 | Boyle et al. |
| 7,859,782 B1 | 12/2010 | Lee |
| 7,872,822 B1 | 1/2011 | Rothberg |
| 7,898,756 B1 | 3/2011 | Wang |
| 7,898,762 B1 | 3/2011 | Guo et al. |
| 7,900,037 B1 | 3/2011 | Fallone et al. |
| 7,907,364 B2 | 3/2011 | Boyle et al. |
| 7,929,234 B1 | 4/2011 | Boyle et al. |
| 7,933,087 B1 | 4/2011 | Tsai et al. |
| 7,933,090 B1 | 4/2011 | Jung et al. |
| 7,934,030 B1 | 4/2011 | Sargenti, Jr. et al. |
| 7,940,491 B2 | 5/2011 | Szeremeta et al. |
| 7,944,639 B1 | 5/2011 | Wang |
| 7,945,727 B2 | 5/2011 | Rothberg et al. |
| 7,949,564 B1 | 5/2011 | Hughes et al. |
| 7,965,465 B2 | 6/2011 | Sanvido et al. |
| 7,974,029 B2 | 7/2011 | Tsai et al. |
| 7,974,039 B1 | 7/2011 | Xu et al. |
| 7,982,993 B1 | 7/2011 | Tsai et al. |
| 7,984,200 B1 | 7/2011 | Bombet et al. |
| 7,990,648 B1 | 8/2011 | Wang |
| 7,992,179 B1 | 8/2011 | Kapner, III et al. |
| 8,004,785 B1 | 8/2011 | Tsai et al. |
| 8,006,027 B1 | 8/2011 | Stevens et al. |
| 8,014,094 B1 | 9/2011 | Jin |
| 8,014,977 B1 | 9/2011 | Masiewicz et al. |
| 8,019,914 B1 | 9/2011 | Vasquez et al. |
| 8,040,625 B1 | 10/2011 | Boyle et al. |
| 8,078,943 B1 | 12/2011 | Lee |
| 8,079,045 B2 | 12/2011 | Krapf et al. |
| 8,082,433 B1 | 12/2011 | Fallone et al. |
| 8,085,487 B1 | 12/2011 | Jung et al. |
| 8,089,719 B1 | 1/2012 | Dakroub |
| 8,090,902 B1 | 1/2012 | Bennett et al. |
| 8,090,906 B1 | 1/2012 | Blaha et al. |
| 8,091,112 B1 | 1/2012 | Elliott et al. |
| 8,094,396 B1 | 1/2012 | Zhang et al. |
| 8,094,401 B1 | 1/2012 | Peng et al. |
| 8,116,020 B1 | 2/2012 | Lee |
| 8,116,025 B1 | 2/2012 | Chan et al. |
| 8,134,793 B1 | 3/2012 | Vasquez et al. |
| 8,134,798 B1 | 3/2012 | Thelin et al. |
| 8,139,301 B1 | 3/2012 | Li et al. |
| 8,139,310 B1 | 3/2012 | Hogg |
| 8,144,419 B1 | 3/2012 | Liu |
| 8,145,452 B1 | 3/2012 | Masiewicz et al. |
| 8,149,528 B1 | 4/2012 | Suratman et al. |
| 8,154,812 B1 | 4/2012 | Boyle et al. |
| 8,159,768 B1 | 4/2012 | Miyamura |
| 8,161,328 B1 | 4/2012 | Wilshire |
| 8,164,849 B1 | 4/2012 | Szeremeta et al. |
| 8,174,780 B1 | 5/2012 | Tsai et al. |
| 8,190,575 B1 | 5/2012 | Ong et al. |
| 8,194,338 B1 | 6/2012 | Zhang |
| 8,194,340 B1 | 6/2012 | Boyle et al. |
| 8,194,341 B1 | 6/2012 | Boyle |
| 8,201,066 B1 | 6/2012 | Wang |
| 8,271,692 B1 | 9/2012 | Dinh et al. |

(56) References Cited

U.S. PATENT DOCUMENTS

| | | | |
|---|---|---|---|
| 8,279,550 B1 | 10/2012 | Hogg | |
| 8,281,218 B1 | 10/2012 | Ybarra et al. | |
| 8,285,923 B2 | 10/2012 | Stevens | |
| 8,289,656 B1 | 10/2012 | Huber | |
| 8,305,705 B1 | 11/2012 | Roohr | |
| 8,307,156 B1 | 11/2012 | Codilian et al. | |
| 8,310,775 B1 | 11/2012 | Boguslawski et al. | |
| 8,315,006 B1 | 11/2012 | Chahwan et al. | |
| 8,316,263 B1 | 11/2012 | Gough et al. | |
| 8,320,067 B1 | 11/2012 | Tsai et al. | |
| 8,324,974 B1 | 12/2012 | Bennett | |
| 8,332,695 B2 | 12/2012 | Dalphy et al. | |
| 8,341,337 B1 | 12/2012 | Ong et al. | |
| 8,350,628 B1 | 1/2013 | Bennett | |
| 8,356,184 B1 | 1/2013 | Meyer et al. | |
| 8,370,683 B1 | 2/2013 | Ryan et al. | |
| 8,375,225 B1 | 2/2013 | Ybarra | |
| 8,375,274 B1 | 2/2013 | Bonke | |
| 8,380,922 B1 | 2/2013 | DeForest et al. | |
| 8,390,948 B2 | 3/2013 | Hogg | |
| 8,390,952 B1 | 3/2013 | Szeremeta | |
| 8,392,689 B1 | 3/2013 | Lott | |
| 8,407,393 B1 | 3/2013 | Yolar et al. | |
| 8,413,010 B1 | 4/2013 | Vasquez et al. | |
| 8,417,566 B2 | 4/2013 | Price et al. | |
| 8,421,663 B1 | 4/2013 | Bennett | |
| 8,422,172 B1 | 4/2013 | Dakroub et al. | |
| 8,427,771 B1 | 4/2013 | Tsai | |
| 8,429,343 B1 | 4/2013 | Tsai | |
| 8,433,937 B1 | 4/2013 | Wheelock et al. | |
| 8,433,977 B1 | 4/2013 | Vasquez et al. | |
| 8,458,526 B2 | 6/2013 | Dalphy et al. | |
| 8,462,466 B2 | 6/2013 | Huber | |
| 8,467,151 B1 | 6/2013 | Huber | |
| 8,489,841 B1 | 7/2013 | Strecke et al. | |
| 8,493,679 B1 | 7/2013 | Boguslawski et al. | |
| 8,498,074 B1 | 7/2013 | Mobley et al. | |
| 8,499,198 B1 | 7/2013 | Messenger et al. | |
| 8,512,049 B1 | 8/2013 | Huber et al. | |
| 8,514,506 B1 | 8/2013 | Li et al. | |
| 8,531,791 B1 | 9/2013 | Reid et al. | |
| 8,554,741 B1 | 10/2013 | Malina | |
| 8,560,759 B1 | 10/2013 | Boyle et al. | |
| 8,560,879 B1 * | 10/2013 | Goel | 714/6.1 |
| 8,565,053 B1 | 10/2013 | Chung | |
| 8,576,511 B1 | 11/2013 | Coker et al. | |
| 8,578,100 B1 | 11/2013 | Huynh et al. | |
| 8,578,242 B1 | 11/2013 | Burton et al. | |
| 8,589,773 B1 | 11/2013 | Wang et al. | |
| 8,593,753 B1 | 11/2013 | Anderson | |
| 8,595,432 B1 | 11/2013 | Vinson et al. | |
| 8,599,510 B1 | 12/2013 | Fallone | |
| 8,601,248 B2 | 12/2013 | Thorsted | |
| 8,611,032 B2 | 12/2013 | Champion et al. | |
| 8,612,650 B1 | 12/2013 | Carrie et al. | |
| 8,612,706 B1 | 12/2013 | Madril et al. | |
| 8,612,798 B1 | 12/2013 | Tsai | |
| 8,619,383 B1 | 12/2013 | Jung et al. | |
| 8,621,115 B1 | 12/2013 | Bombet et al. | |
| 8,621,133 B1 | 12/2013 | Boyle | |
| 8,626,463 B2 | 1/2014 | Stevens et al. | |
| 8,630,052 B1 | 1/2014 | Jung et al. | |
| 8,630,056 B1 | 1/2014 | Ong | |
| 8,631,188 B1 | 1/2014 | Heath et al. | |
| 8,634,158 B1 | 1/2014 | Chahwan et al. | |
| 8,635,412 B1 | 1/2014 | Wilshire | |
| 8,640,007 B1 | 1/2014 | Schulze | |
| 8,654,619 B1 | 2/2014 | Cheng | |
| 8,661,193 B1 | 2/2014 | Cobos et al. | |
| 8,667,248 B1 | 3/2014 | Neppalli | |
| 8,670,205 B1 | 3/2014 | Malina et al. | |
| 8,683,295 B1 | 3/2014 | Syu et al. | |
| 8,683,457 B1 | 3/2014 | Hughes et al. | |
| 8,687,306 B1 | 4/2014 | Coker et al. | |
| 8,693,133 B1 | 4/2014 | Lee et al. | |
| 8,694,841 B1 | 4/2014 | Chung et al. | |
| 8,699,159 B1 | 4/2014 | Malina | |
| 8,699,171 B1 | 4/2014 | Boyle | |
| 8,699,172 B1 | 4/2014 | Gunderson et al. | |
| 8,699,175 B1 | 4/2014 | Olds et al. | |
| 8,699,185 B1 | 4/2014 | Teh et al. | |
| 8,700,850 B1 | 4/2014 | Lalouette | |
| 8,743,502 B1 | 6/2014 | Bonke et al. | |
| 8,749,910 B1 | 6/2014 | Dang et al. | |
| 8,751,699 B1 | 6/2014 | Tsai et al. | |
| 8,755,141 B1 | 6/2014 | Dang | |
| 8,755,143 B2 | 6/2014 | Wilson et al. | |
| 8,756,361 B1 | 6/2014 | Carlson et al. | |
| 8,756,382 B1 | 6/2014 | Carlson et al. | |
| 8,769,593 B1 | 7/2014 | Schwartz et al. | |
| 8,773,802 B1 | 7/2014 | Anderson et al. | |
| 8,780,478 B1 | 7/2014 | Huynh et al. | |
| 8,782,334 B1 | 7/2014 | Boyle et al. | |
| 8,793,532 B1 | 7/2014 | Tsai et al. | |
| 8,797,669 B1 | 8/2014 | Burton | |
| 8,799,977 B1 | 8/2014 | Kapner, III et al. | |
| 8,819,375 B1 | 8/2014 | Pruett et al. | |
| 8,825,976 B1 | 9/2014 | Jones | |
| 8,825,977 B1 | 9/2014 | Syu et al. | |
| 8,880,976 B2 * | 11/2014 | Weathers | 714/758 |
| 2007/0174582 A1 | 7/2007 | Feldman | |
| 2009/0113702 A1 | 5/2009 | Hogg | |
| 2010/0306551 A1 | 12/2010 | Meyer et al. | |
| 2011/0226729 A1 | 9/2011 | Hogg | |
| 2012/0159042 A1 | 6/2012 | Lott et al. | |
| 2012/0275050 A1 | 11/2012 | Wilson et al. | |
| 2012/0281963 A1 | 11/2012 | Krapf et al. | |
| 2012/0324980 A1 | 12/2012 | Nguyen et al. | |
| 2013/0159644 A1 * | 6/2013 | Lee | 711/162 |
| 2014/0101515 A1 * | 4/2014 | Akiyama et al. | 714/763 |
| 2014/0201424 A1 | 7/2014 | Chen et al. | |

\* cited by examiner

| LBA | PBA |
|---|---|
| ⋮ | ⋮ |
| 1000 | 6333 |
| 1001 | 2021 |
| 1002 | 2022 |
| 1003 | 2023 |
| 1004 | 2024 |
| ⋮ | ⋮ |
| 3505 | 2025 |
| 3506 | 10521 |
| 3507 | 10522 |
| ⋮ | ⋮ |

DATA ACCESS FOR SHINGLED MAGNETIC RECORDING MEDIA

CROSS-REFERENCE TO RELATED APPLICATIONS

This application claims the benefit of U.S. Provisional Application No. 61/822,666, filed on May 13, 2013, which is hereby incorporated by reference in its entirety.

BACKGROUND

Disk drives are often used to write data on or to read data from a recording media. A disk drive can include multiple rotating magnetic disks with tracks for storing data and heads to read data from the disks and/or to write data on the disks. The disks are typically arranged in a stacked configuration with the heads arranged in a corresponding stacked assembly referred to as a head stack assembly (HSA). The HSA can be attached to an actuator that is typically moved by a voice coil motor (VCM). This arrangement ordinarily allows for positioning of the head to read data from or to write data on an adjacent surface of one of the disks in the stack.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed. Reference numbers are reused throughout the drawings to indicate correspondence between referenced elements.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

One problem encountered by disk drives is a long data access time which includes the amount of time it takes to move the actuator to a target location in order to read or write data in accordance with a read or write command received from a host. This problem is worsened when the actuator must move or seek over a relatively far distance across the disk. Such seek delays can decrease the overall performance of the disk drive.

In an effort to reduce such mechanical latency, disk drives typically use pre-read and post-read operations. Data written on a disk of a conventional disk drive is generally written in an ascending order of the host's logical addressing (i.e., logical block addresses). When the host modifies data at a particular logical block address (LBA), a conventional disk drive can re-write the portion of the disk storing the data. Since data requested in a series of read commands from the host is often related, such related data frequently precedes or follows previously requested data on a disk. Conventional disk drives have made use of this host read command tendency with pre-read and post-read operations which take advantage of the head being positioned near the requested data to also read a portion of the data which precedes and/or follows the requested data on the disk. The pre-read and/or post-read data can then be stored in a cache memory which is not affected by mechanical latency. As a result, data access is often improved when the host subsequently requests related data located before or after previously requested data since the related data can be provided from the cache memory.

In addition to accessing data quicker, the data storage industry is also trying to increase the recording density of the disk, or in other words, the amount of data that can be stored in a given area on the disk. Shingled magnetic recording (SMR) has recently been introduced as a way of increasing the number of tracks per inch (TPI) by making the tracks narrower. Since it is technologically easier to read narrow tracks than to write narrow tracks, SMR increases TPI by using a relatively wide shingle write head with a stronger magnetic field to overlap tracks like roof shingles. The non-overlapping portion then serves as a narrow track that can be read by a narrower read head.

Although a higher number of TPI is possible with SMR, the overlap in tracks can create a problem when writing data since new writes to a previously overlapped track affects data written in the overlapping track. For this reason, tracks are usually sequentially written to avoid affecting previously written data. However, such sequential writing can prevent data from being written on the disk in the conventional ascending order of host LBAs. Unlike a conventional disk drive, an SMR disk drive will usually write to a new portion of the disk when the host modifies data at a particular LBA since re-writing a previously written portion would affect other data in an overlapping track. A translation table is used to track the location of the valid LBAs.

Consequently, an SMR disk ordinarily includes a more random distribution of LBAs than a conventional disk with non-overlapping tracks. In addition, LBAs are often repeated on an SMR disk for data which has been modified. These logical addressing changes for SMR disks present new challenges to performing pre-read and post-read operations. For example, conventional pre-read and post-read operations cannot assume that pre-read and post-read data on an SMR disk is likely related to data requested by a read command. In addition, conventional pre-read and post-read operations may not be able to quickly determine if pre-read or post-read data is still valid (i.e., the most recently written data) for a particular LBA.

Figure 1:
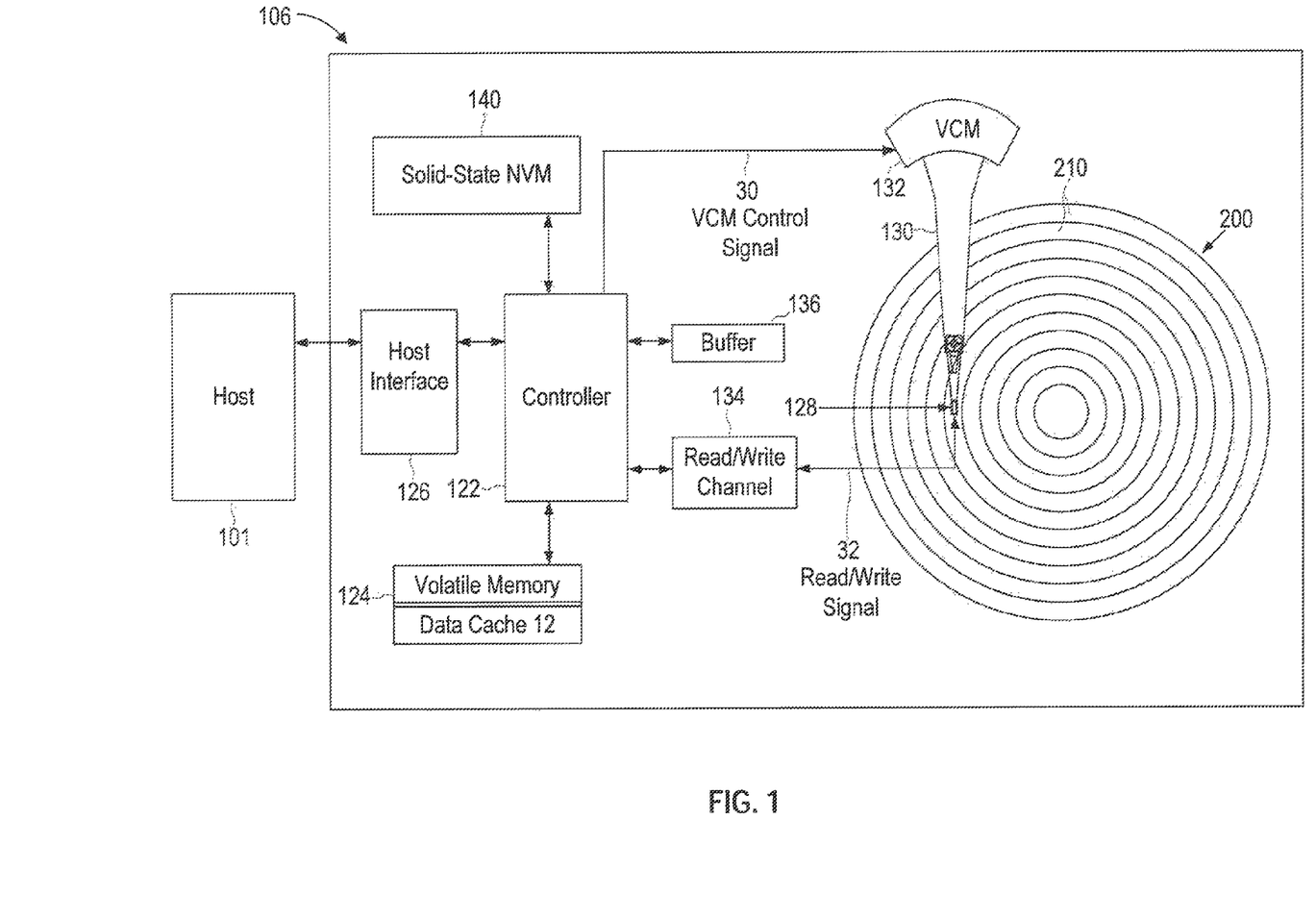
FIG. 1 is a block diagram depicting a disk drive according to an embodiment.

FIG. 1 illustrates a block diagram of disk drive 106 according to one example embodiment. As shown in FIG. 1, disk drive 106 includes controller 122 which can perform various operations of disk drive 106 described herein. Controller 122 can be implemented using one or more processors for executing instructions and can include a microcontroller, a Digital Signal Processor (DSP), an Application Specific Integrated Circuit (ASIC), a Field Programmable Gate Array (FPGA), hard-wired logic, analog circuitry and/or a combination thereof.

In the example of FIG. 1, disk drive 106 includes rotating magnetic disk 200 and head 128 connected to the distal end of actuator 130 which is rotated by voice coil motor (VCM) 132 to position head 128 over disk 200. Head 128 includes at least a read element (i.e., read element 142 in FIG. 2) for reading data from disk 200, and a write element (i.e., write element 144 in FIG. 2) for writing data on disk 200.

Disk 200 comprises a number of radial spaced, concentric tracks 210 for storing data. Each track 210 is divided into a number of sectors (i.e., sectors 222 in FIG. 2) that are spaced circumferentially along tracks 210. The sectors may be used to store user data of host 101 and/or other information. As understood by those of ordinary skill in the art, disk drive 106 can include multiple disks in a stacked configuration with disk 200.

Disk drive 106 also includes solid-state non-volatile memory (NVM) 140 for storing data. In this regard, solid-state NVM may store user data provided by host 101 and/or firmware for disk drive 106 which can include computer-readable instructions used by disk drive 106 to implement the processes described below.

While the description herein refers to solid-state NVM generally, it is understood that solid-state memory may comprise one or more of various types of memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory (e.g., single-level cell (SLC) memory, multi-level cell (MLC) memory, or any combination thereof), NOR memory, EEPROM, Ferroelectric Memory (FeRAM), Magnetoresistive RAM (MRAM), other discrete NVM (non-volatile memory) chips, or any combination thereof.

Volatile memory 124 can include, for example, a DRAM. Data stored in volatile memory 124 can include data read from disk 200, data to be written to disk 200, and/or instructions for disk drive 106, such as instructions loaded into volatile memory 124 for operating disk drive 106. As shown in FIG. 1, volatile memory 124 includes data cache 12 which can be used to store user data read as part of pre-read and post-read operations as discussed in more detail below.

Host interface 126 is configured to interface disk drive 106 with host 101 and may interface according to a standard such as, for example, PCI express (PCIe), serial advanced technology attachment (SATA), or serial attached SCSI (SAS). As will be appreciated by those of ordinary skill in the art, host interface 126 can be included as part of controller 122. Although FIG. 1 depicts the co-location of host 101 and disk drive 106, in some embodiments the two need not be physically co-located. In some embodiments, disk drive 106 may be located remotely from host 101 and connected to host 101 via a network interface.

Read/write channel 134 encodes data to be written to disk 200 and decodes data read from disk 200. In the example implementation of FIG. 1, read/write channel 134 employs an error correcting code, such as low-density parity-check (LDPC) code, for error correction of data read from disk 200. Read/write channel 134 may therefore include circuitry serving as an LDPC encoder and an LDPC decoder. As discussed in more detail below, error correcting code can also allow controller 122 to recover logical block addresses (LBAs) for user data read during pre-read and/or post-read operations.

Buffer 136 is a memory for storing data structures such as circular buffers to facilitate read and write operations of disk drive 106. As discussed below with reference to FIGS. 5 and 6, buffer 136 can be used to store LBAs for user data to be written to disk 200 and LBAs for user data read from disk 200.

In operation, controller 122 initiates writing user data to and reading user data from disk 200 in response to commands from host 101. To write user data received from host 101 to disk 200, controller 122 positions head 128 over disk 200 by sending VCM control signal 30 (e.g., control current) to VCM 132 which moves actuator 130 to a target location. Controller 122 processes data to be written to disk 200 and sends the data to read/write channel 134 for encoding into write signal 32, which is output to head 128. For its part, head 128 converts write signal 32 into a magnetic field that magnetizes the surface of disk 200 based upon write signal 32, thereby magnetically writing data on disk 200. Controller 122 may notify host 101 after data for the write command has been successfully written on disk 200.

When controller 122 receives a read command from host 101 requesting user data written on disk 200, controller 122 positions head 128 over disk 200 by sending VCM control signal 30 to VCM 132 which moves actuator 130 to a target location. Head 128 then generates read signal 32 based upon the magnetization of the disk surface under head 128. Read/write channel 134 decodes read signal 32 into data to be processed by controller 122, which in turn, sends the requested user data to host 101 via host interface 126.

Those of ordinary skill in the art will appreciate that disk drive 106 can include more or less than those elements shown in FIG. 1 and that the disclosed read and write processes may be implemented in other environments.

Figure 2:
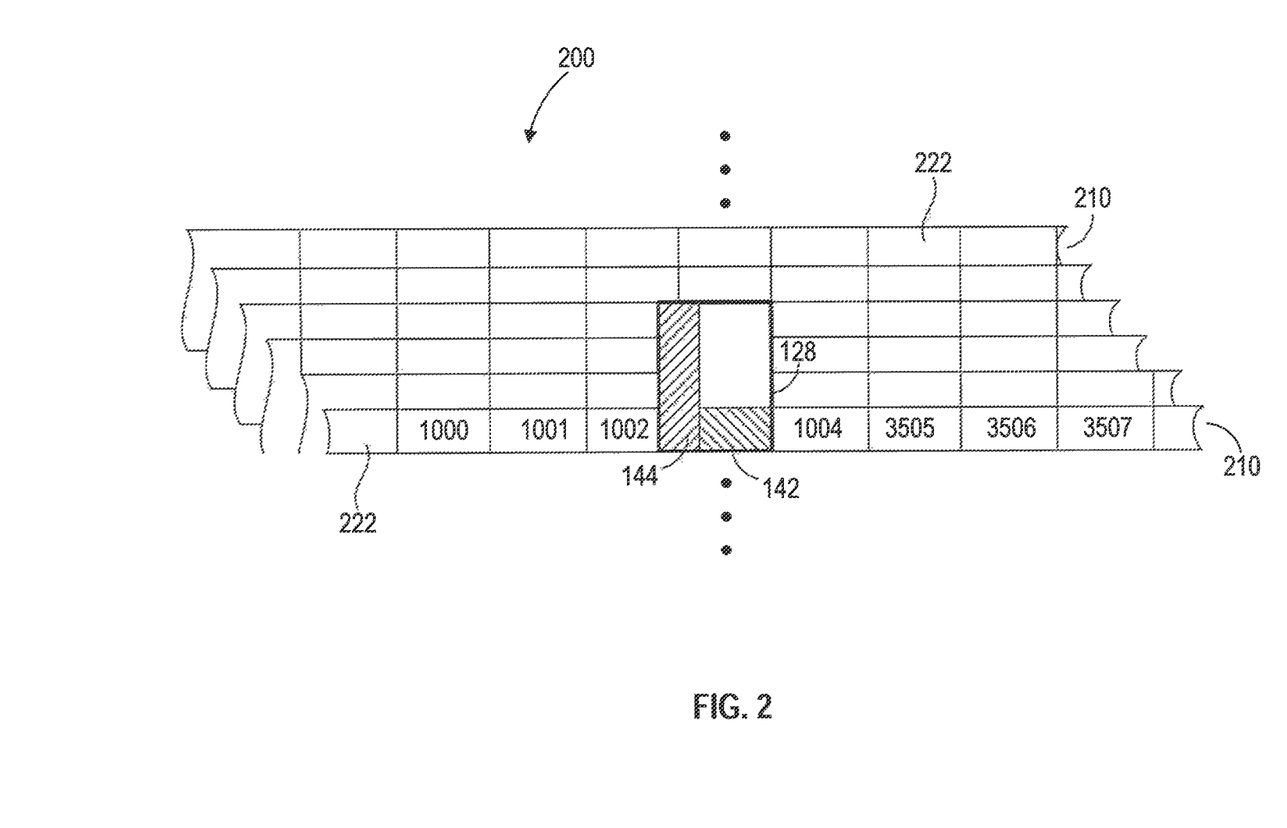
FIG. 2 illustrates a portion of a disk written with shingled magnetic recording (SMR) according to an embodiment.

FIG. 2 illustrates a portion of disk 200 written by head 128 according to an embodiment. To increase the data storage capacity of disk 200, disk drive 106 has the capability to write data to disk 200 using SMR so that tracks on disk 200 overlap. More specifically, write element 144 of head 128 is adapted for SMR which means that, among other things, it is wider than read element 142 of head 128. The non-overlapping portions of the overlapping tracks serve as narrow tracks 210 that can be read by narrower read element 142 of head 128.

In addition to overlapping SMR tracks 210, FIG. 2 also includes sectors 222 for storing a fixed amount of data, such as 2,048 bytes, 1,024 bytes or 4,096 bytes. User data in each sector 222 is associated with a logical block address (LBA) used by host 101 to address user data. As noted above, an SMR disk such as disk 200 will ordinarily include a more random distribution of LBAs than a conventional disk with non-overlapping tracks. In addition, since LBAs are often repeated on an SMR disk for user data which has been modified by the host, a particular sector on an SMR disk may not include valid (i.e., the most recent) user data associated with a particular LBA.

In the example of FIG. 2, head 128 is in the process of servicing a read command from host 101 which requests user data associated with LBAs 1001, 1002 and 1003. As part of pre-read and post-read operations, disk drive 106 reads sectors before and after the sectors associated with the requested LBAs. Specifically, disk drive 106 reads the sectors designated with LBAs 1000, 1004, 3505, 3506 and 3507, in addition to the sectors designated with LBAs 1001, 1002 and 1003 (not shown).

To facilitate pre-read and post-read operations on SMR disk 200, controller 122 can evaluate the LBAs for each of the pre-read and post-read sectors before determining whether to store user data from the pre-read and post/read sectors in data cache 12. Due to the possibility of reading obsolete user data from the pre-read and post-read sectors, controller 122 can use the LBAs associated with the pre-read and post-read sectors to determine if user data read from the pre-read and post-read sectors is valid.

In one embodiment, the validity of the user data in pre-read and post-read sectors can be determined by determining whether a logical-to-physical translation map still references the LBAs associated with the user data of the pre-read and post-read sectors as being located in those physical sectors. Controller 122 may use a logical-to-physical translation table stored in at least one of solid-state NVM 140, volatile memory 124 and disk 200.

Figure 3A:
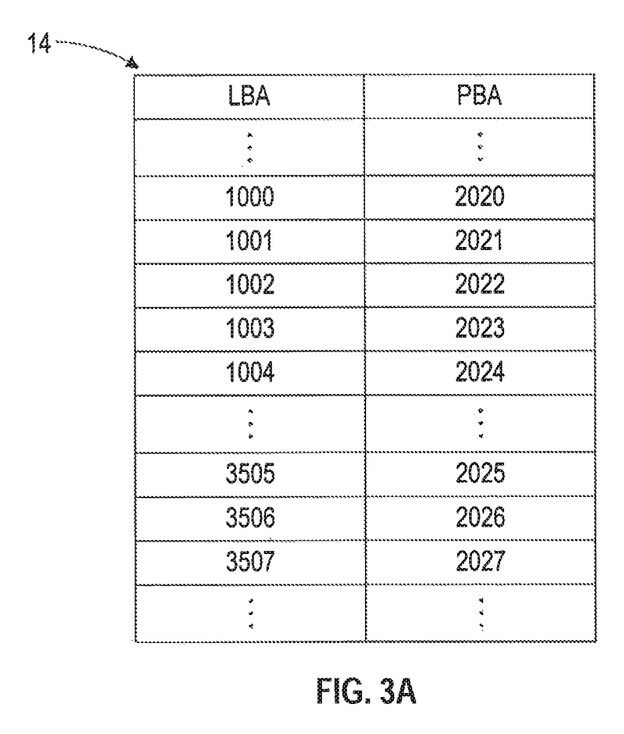
FIG. 3A depicts a logical-to-physical translation table in a first state according to an embodiment.
Figure 3B:
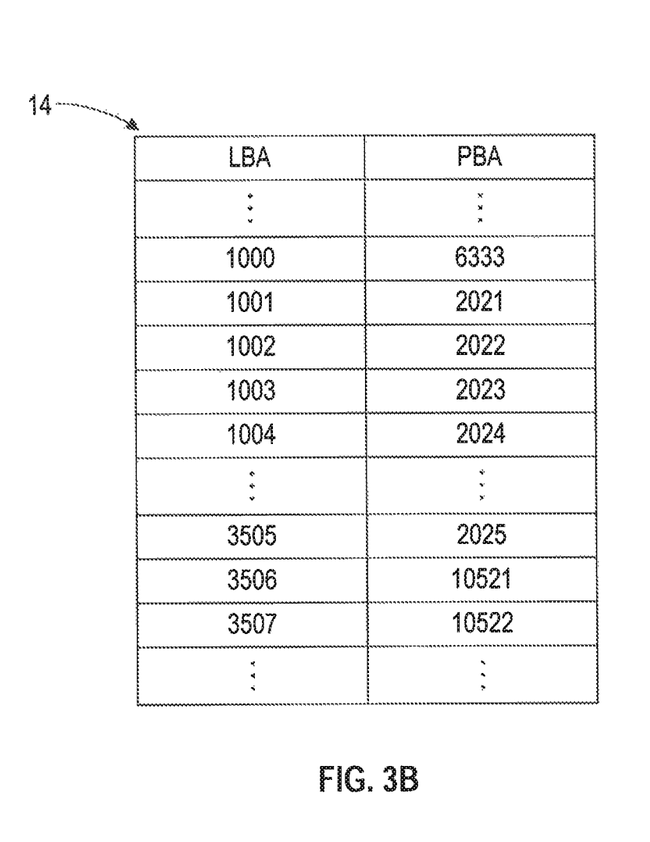
FIG. 3B depicts the logical-to-physical translation table of FIG. 3A in a second state according to an embodiment.

FIGS. 3A and 3B depict an example of such a logical-to-physical translation table as translation table 14 which maps LBAs to corresponding physical block addresses (PBAs) for sectors on disk 200. While the LBAs correspond to logical addresses associated with the user data, the PBAs identify a particular sector or sectors where the user data associated with the LBA is written on disk 200. Specifically, the PBAs of translation table 14 indicate a location for the most recently written user data for a particular LBA.

Translation table 14 is sorted by LBAs to facilitate lookup of a given LBA for data read from disk 200. If a PBA for a looked-up LBA does not match the PBA where the user data was read, then the read user data is no longer valid because the most recently written user data for the LBA is located at a different PBA.

FIG. 3A depicts translation table 14 in a first state corresponding to the LBAs shown in FIG. 2. As shown in FIG. 3A, LBAs 1000 to 1004 and LBAs 3505 to 3507 are associated with user data written at PBAs 2020 to 2027.

FIG. 3B depicts translation table 3B in a later second state where some of the user data associated with the LBAs in FIG. 3A have been rewritten to new PBAs. In particular, user data LBAs 1000, 3506 and 3507 have been rewritten to PBAs 6333, 10521, and 10522, respectively.

Due to the sequential writing of SMR disk 200, user data read from sectors addressed with PBAs of 2020, 2026, and 2027 is no longer valid for LBAs 1000, 3505, and 3507 in the second state. In other words, the user data stored in such sectors is obsolete since the user data corresponds to the earlier version of the user data which has been rewritten at a later PBA. Accordingly, controller 122 may determine not to store user data read from such sectors in data cache 12 during a pre-read or post-read operation since this user data is obsolete.

The LBAs can also be used to determine whether the user data meets a data cache policy for storing user data in data cache 12. In one example, controller 122 may determine not to store user data read from pre-read or post-read sectors if the LBAs associated with these sectors differ by more than a predetermined amount from an LBA for user data requested by the host. A large difference in LBAs may indicate that the pre-read or post-read user data is not related to the requested user data and may therefore not be worth storing in data cache 12. In some other examples, the controller may determine whether to cache an LBA based on one or more caching policies such as most frequently used, most recently used, etc.

In the example of FIG. 2, sectors designated with LBAs 3505, 3506 and 3507 may be determined to include user data unrelated to the user data stored in sectors designated with LBAs 1000, 1001, 1002, 1003 and 1004 due to the differences in their LBAs and/or LBA ranges.

In this regard, a data cache policy may consider whether LBAs associated with pre-read and post-read sectors follow a sequential pattern in determining whether to store user data read from pre-read and post-read sectors in data cache 12.

Although an LBA may be written in each sector with the user data, this approach can decrease an overall data capacity of disk 200 given a large number of sectors on disk 200. Instead, coding ordinarily performed by read/write channel 134 for error correction can be used to recover an LBA associated with a pre-read or post-read sector without having to store the LBA in an NVM such as disk 200 or solid-state NVM 140. In this regard, any error correcting code may be used by read/write channel 134. Examples of such error correcting codes can include convolutional code, Reed-Solomon code, or LDPC code.

Figure 4A:
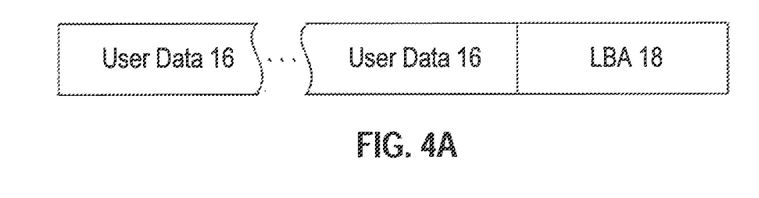
FIG. 4A illustrates data for low-density parity-check (LDPC) encoding according to an embodiment.

FIG. 4A illustrates a set of data to be encoded by read/write channel 134 to generate parity data 22 for a particular sector in accordance with LDPC code. As shown in FIG. 4A, user data 16 is encoded along with its associated LBA 18. In other words, the parity data is generated based on the combination of user data 16 and LBA 18. User data 16 is provided from host 101 as part of a write command received by disk drive 106. LBA 18 can also be provided by host 101 or can be determined by controller 122 from a range of LBAs provided by host 101.

Figure 4B:
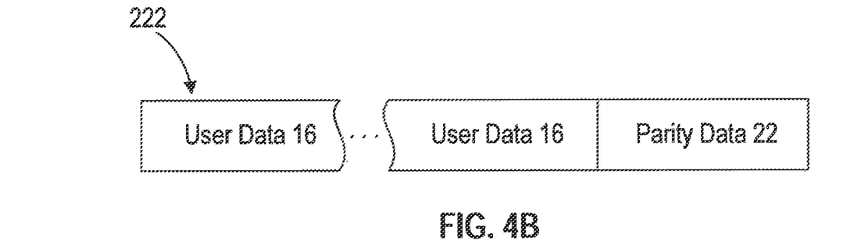
FIG. 4B illustrates data for writing to a sector on a disk according to an embodiment.

FIG. 4B illustrates data written to disk 200 after generating parity data from the data of FIG. 4A. As shown in FIG. 4B, user data 16 is written with parity data 22 which was generated from the set of data shown in FIG. 4A. In the example of FIG. 4B, the data written to sector 222 does not include LBA 18. Instead, LBA 18 associated with user data 16 can be recovered when reading sector 222, through LDPC decoding by read/write channel 134.

In more detail, the LBA may be recovered as follows. In one embodiment, LLRs (log likelihood ratios) for the LBA bits are set to 0's corresponding to an erasure. The result of a successful decoding is that the original LBA bits (LBA 18 shown in FIG. 4A) are recovered. Note that the number of bits in the LBA (32 or more bits) is typically significantly below the correction capability of the LDPC decoder, which can be in the hundreds or thousands of bits or more. Therefore, by virtue of having the parity data generated over the user data and the LBA, the decoder be can be leveraged to recover the LBA without having to physically write the LBA to the disk media. Note also that in a global iteration, the LLRs passed from the LDPC decoder to an ISI (Inter-Symbol Interference) or SOVA (Soft Output Viterbi Algorithm) detector do not include the LLRs for the LBA. However, the LLRs passed from the LDPC decoder to the ISI or SOVA detector will have been influenced by the LLRs for the LBA bits. In some embodiments, the same concept is extended to recover any other metadata associated with the user data that is not written to the media.

Figure 5:
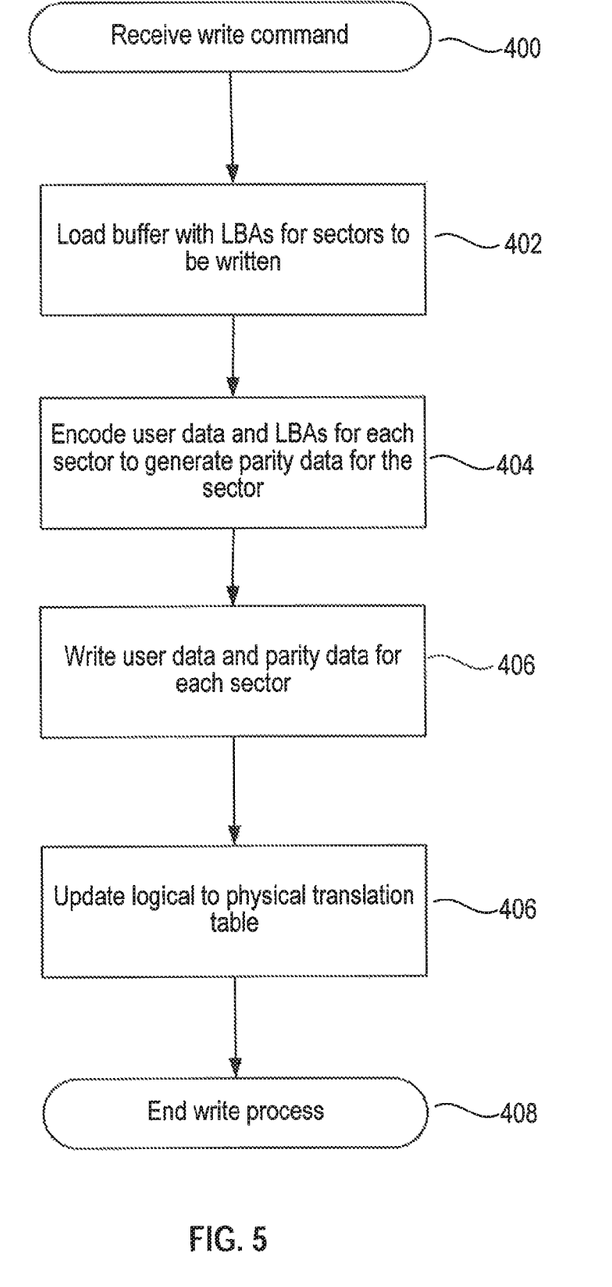
FIG. 5 is a flowchart for a write process according to an embodiment.

FIG. 5 is a flowchart for a write process which can be performed by disk drive 106 according to an embodiment. In block 400, controller 122 receives a write command from host 101 via host interface 126. The write command includes user data to be written to disk 200 in addition to LBA information associated with the user data. The LBA information can include, for example, LBAs for the user data or a range of LBAs for the user data.

In block 402, controller 122 loads LBAs from the write command into buffer 136 for sectors to be written on disk 200. More specifically, the LBAs can be loaded into a circular buffer or other data structure in buffer 136 which facilitates a sequential ordering of the LBAs for each of the sectors to be written.

In block 404, read/write channel 134 encodes the user data and LBAs for each sector in accordance with an error correcting code to generate parity data for the user data and LBAs.

In block 406, the user data and parity data for each sector is written to disk 200 and a logical-to-physical translation table stored in disk drive 106 is updated for the newly written LBAs. The write process of FIG. 5 then ends in block 408.

Figure 6:
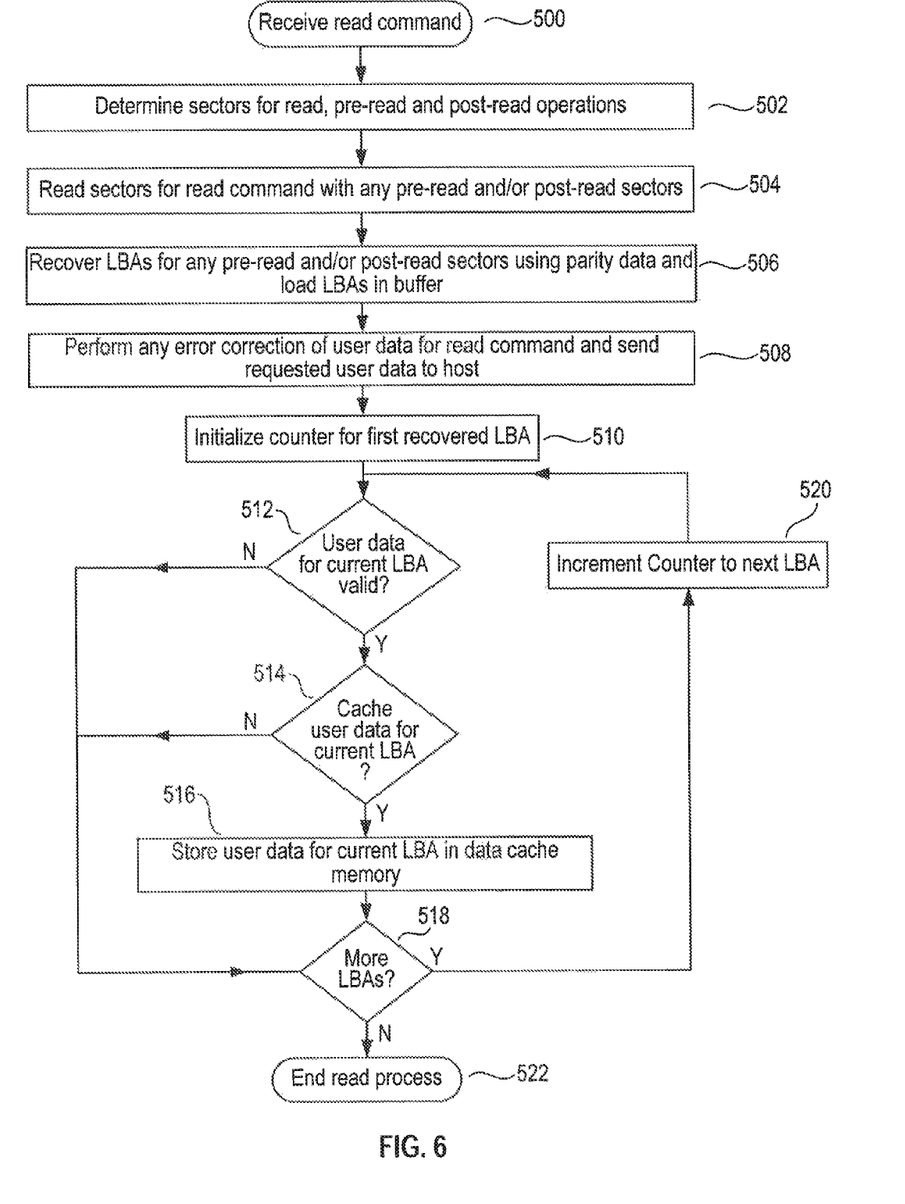
FIG. 6 is a flowchart for a read process according to an embodiment.

FIG. 6 is a flowchart for a read process which can be performed by disk drive 106 according to an embodiment. In block 500, controller 122 receives a read command from host 101 via host interface 126. The read command includes LBA information which can include LBAs or a range of LBAs for user data requested by the read command.

Controller 122 in block 502 determines the sectors that correspond to the LBAs for the requested user data. This may be performed by using logical-to-physical translation table 14 to identify the most recently written PBAs for LBAs included in the read command. In addition, controller 122 determines a number of pre-read and/or post-read sectors to read while servicing the read command. For example, controller 122 may determine that two sectors should be pre-read and that six sectors should be post-read. The number of pre-read and post-read sectors can be determined based on an adaptive algorithm and/or a heuristic method performed by controller 122. In this regard, the number of pre-read and post-read sectors can vary from one read command to the next.

In block 504, data including user data and parity data is read by head 128 from the sectors determined in block 502. The read data is sent to read/write channel 134 via read signal 32.

In block 506, read/write channel 134 recovers LBAs for any pre-read and/or post-read sectors by using the parity data to correct a default LBA for each sector. The recovered LBAs may be temporarily stored in buffer 136 while any needed error correction is performed in block 508 and the requested user data is sent to host 101 via host interface 126.

In block 510, a counter is initialized for processing the LBAs recovered in block 506 and controller 122 in block 512 determines the validity of user data associated with a current recovered LBA retrieved from buffer 136. This can be performed by using translation table 14 of FIG. 3 to check if the PBA in the table still matches the PBA of the pre/post-read sector from which the current recovered LBA is recovered. If not, the user data for the current recovered LBA is determined to be no longer valid and the process proceeds to block 518 where controller 122 checks if there are more recovered LBAs to be processed. If not, the read process of FIG. 6 ends in block 522. If there are more recovered LBAs, the counter for the current recovered LBA is incremented to the next recovered LBA and the process returns to block 512.

If controller 122 determines in block 512 that the user data for the current recovered LBA is valid, controller 122 determines whether to store user data for the current LBA in data cache 12. In particular, controller 122 determines whether the user data meets a data cache policy such as whether the user data is likely related to user data requested by the read command of block 500. In one embodiment, the decision on whether the user data for the current LBA meets a data cache policy is based on whether the current recovered LBA differs by more than a predetermined amount from the LBAs for the user data requested by the read command. A significant difference in LBAs may indicate that the current recovered LBA is not related to the requested user data and is therefore less likely to soon be requested by host 101. In another embodiment, the decision on whether the user data for the current recovered LBA meets the data cache policy is based on whether the current recovered LBA sequentially follows or precedes a previous recovered LBA or an LBA for user data requested in the read command. Non-sequential LBAs may indicate that the user data for the current recovered LBA is not related to the user data requested by host 101 in the read command.

In other embodiments, block 514 may be omitted so that the determination of whether to store the user data is only based on whether the user data is valid. In such embodiments, user data is stored in data cache 12 whenever the user data is determined to be valid for the current recovered LBA.

If it is determined to store the user data, controller 122 in block 516 stores the user data in data cache 12. Controller 122 checks if more LBAs need to be processed for pre-read and post-read sectors, and if so, the process proceeds to block 520. If it is determined that no more recovered LBAs remain in block 518, the read process of FIG. 6 ends in block 522.

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes a processor or computer to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, and controllers described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The activities of a method or process described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable disk, an optical disc, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC).

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive and the scope of the disclosure is, therefore, indicated by the following claims rather than by the foregoing description. All changes which come within the meaning and range of equivalency of the claims are to be embraced within their scope.

What is claimed is:

1. A method for performing pre-read and/or post-read operations in a disk drive in communication with a host, wherein the disk drive includes a data cache memory and at least one disk with a plurality of sectors for storing data, the method comprising:
receiving a read command from the host requesting user data from a first sector of the plurality of sectors;
reading user data and parity data from a second sector of the plurality of sectors during a pre-read or post-read operation in performing the read command, wherein the second sector is adjacent the first sector on the at least one disk, and wherein the parity data can be used for error correction of the user data read from the second sector;
recovering a logical block address (LBA) for the user data read from the second sector using the parity data, wherein the LBA is not stored on the at least one disk with the user data; and
determining whether to store in the data cache memory the user data read from the second sector during the operation based on the recovered LBA for the user data read from the second sector.

2. The method of claim 1, wherein recovering the LBA for the user data includes decoding the parity data using a low-density parity-check (LDPC) code.

3. The method of claim 1, wherein the second sector forms a portion of a track on the at least one disk which overlaps another track on the at least one disk.

4. The method of claim 1, wherein determining whether to store the user data read from the second sector includes determining whether the user data read from the second sector is valid.

5. The method of claim 4, wherein the disk drive uses a translation table mapping LBAs to physical block addresses (PBAs) for the at least one disk, and wherein determining the validity of the user data read from the second sector is based at least in part on a mapping of the recovered LBA in the translation table.

6. The method of claim 1, wherein determining whether to store the user data read from the second sector includes determining whether the user data read from the second sector meets a data cache policy.

7. The method of claim 1, wherein the disk drive includes a buffer for storing data, and wherein the method further comprises storing the recovered LBA in the buffer for determining whether to store the user data read from the second sector in the data cache memory.

8. A method for writing data to at least one disk of a disk drive in communication with a host to facilitate pre-read and/or post-read operations in the disk drive, the method comprising:
receiving a write command from the host including a logical block address (LBA) for user data in the write command;
generating parity data for error correction of the user data by encoding the LBA and the user data;
writing the user data and the parity data on the at least one disk;
wherein the LBA for the user data is not written to the at least one disk and can be recovered using the parity data when read from the at least one disk; and
based on the recovered LBA, determining whether to store the user data in a data cache memory of the disk drive when the user data is read during a pre-read or post-read operation.

9. The method of claim 8, wherein generating parity data includes encoding the LBA and the user data using a low-density parity-check (LDPC) code.

10. The method of claim 8, wherein writing the user data and the parity data includes writing the user data and the parity data in a track on the at least one disk which overlaps another track on the at least one disk.

11. The method of claim 8, wherein the disk drive includes a buffer for storing data, and wherein the method further comprises storing the LBA of the write command in the buffer for generating the parity data.

12. A disk drive in communication with a host, the disk drive comprising:
a data cache memory for storing data;
at least one disk with a plurality of sectors for storing data; and
a controller configured to:
receive a read command from the host requesting user data from a first sector of the plurality of sectors;
read user data and parity data from a second sector of the plurality of sectors during a pre-read or post-read operation in performing the read command, wherein the second sector is adjacent the first sector on the at least one disk, and wherein the parity data can be used for error correction of the user data read from the second sector;
recover a logical block address (LBA) for the user data read from the second sector using the parity data, wherein the LBA is not stored on the at least one disk with the user data; and
determine whether to store in the data cache memory the user data read from the second sector during the pre-read or post-read operation based on the recovered LBA for the user data read from the second sector.

13. The disk drive of claim 12, wherein the controller is further configured to recover the LBA for the user data by at least decoding the parity data using a low-density parity-check (LDPC) code.

14. The disk drive of claim 12, wherein the second sector forms a portion of a track on the at least one disk which overlaps another track on the at least one disk.

15. The disk drive of claim 12, wherein the controller is further configured to determine whether to store the user data read from the second sector by at least determining whether the user data read from the second sector is valid.

16. The disk drive of claim 15, wherein the disk drive uses a translation table mapping LBAs to physical block addresses (PBAs) for the at least one disk, and wherein determining the validity of the user data read from the second sector is based at least in part on a mapping of the recovered LBA in the translation table.

17. The disk drive of claim 12, wherein the controller is further configured to determine whether to store the user data read from the second sector by at least determining whether the user data read from the second sector meets a data cache policy.

18. The disk drive of claim 12, further comprising a buffer for storing data, and wherein the controller is further configured to store the recovered LBA in the buffer for determining whether to store the user data read from the second sector in the data cache memory.

19. A disk drive in communication with a host, the disk drive comprising:
   at least one disk for storing data; and
   a controller configured to:
      receive a write command from the host including a logical block address (LBA) for user data in the write command;
      generate parity data for error correction of the user data by encoding the LBA and the user data;
      write the user data and the parity data on the at least one disk;
      wherein the LBA for the user data is not written to the at least one disk and can be recovered using the parity data when read from the at least one disk; and
      based on the recovered LBA, determine whether to store the user data in a data cache memory of the disk drive when the user data is read during a pre-read or post-read operation.

20. The disk drive of claim 19, wherein the controller is further configured to generate parity data by at least encoding the LBA and the user data using a low-density parity-check (LDPC) code.

21. The disk drive of claim 19, wherein the controller is further configured to write the user data and the parity data by at least writing the user data and the parity data in a track on the at least one disk which overlaps another track on the at least one disk.

22. The disk drive of claim 19, further comprising a buffer for storing data, and wherein the controller is further configured to store the LBA of the write command in the buffer for generating the parity data.

23. The method of claim 1, wherein determining whether to store in the data cache memory the user data read from the second sector during the pre-read or post-read operation further comprises:
   comparing the recovered LBA to an LBA for user data in the first sector; and
   determining whether to store the user data read from the second sector in the data cache memory based on the comparison between the recovered LBA and the LBA for the user data in the first sector.

24. The method of claim 23, further comprising determining not to store the user data read from the second sector in the data cache memory if the recovered LBA differs from the LBA for the user data in the first sector by more than a predetermined amount.

25. The disk drive of claim 12, wherein in determining whether to store in the data cache memory the user data read from the second sector during the pre-read or post-read operation, the controller is further configured to:
   compare the recovered LBA to an LBA for user data in the first sector; and
   determine whether to store the user data read from the second sector in the data cache memory based on the comparison between the recovered LBA and the LBA for the user data in the first sector.

26. The disk drive of claim 25, wherein the controller is further configured to determine not to store the user data read from the second sector in the data cache memory if the recovered LBA differs from the LBA for the user data in the first sector by more than a predetermined amount.

\* \* \* \* \*